Sept. 9, 1969   H. M. JUMPER   3,465,883
FUEL-WATER SEPARATOR AND FILTER
Filed July 25, 1967

INVENTOR
HENRY M. JUMPER
BY *Shoemaker and Mattare*
ATTORNEYS

United States Patent Office 3,465,883
Patented Sept. 9, 1969

3,465,883
FUEL-WATER SEPARATOR AND FILTER
Henry M. Jumper, Gastonia, N.C., assignor to Wix Corporation, Gastonia, N.C., a corporation of North Carolina
Filed July 25, 1967, Ser. No. 655,915
Int. Cl. B01d 35/16, 27/06
U.S. Cl. 210—307                                         6 Claims

ABSTRACT OF THE DISCLOSURE

A fuel-water separator and filter wherein a coalescer is used to coalesce the water in the fuel and also have some filtering action, the fuel and drops of water then passing through a separator and filter, there being no counterflow of fuel with respect to the water in the flow to the separator-filter.

---

This invention relates to the field of coalescing and separating water from fuel and also filtering dirt and other contaminating material from the fuel.

Heretofore the placement of the coalescer and the filter in a housing has been so that the drops of water which have been formed by the coalescer flow countercurrently to the flow of the fuel and thereby allowing some of the moisture to remain in the fuel.

An object of this invention is to coalesce the moisture contained in fuel into drops, with the fuel and drops of water flowing together to a separator-filter wherein the drops are separated from the fuel and the fuel also being filtered of the contained dirt or other contaminating substances so that clean and dry fuel is then transported to the point of use.

Another object of the invention is to so arrange the flow of the contaminated fuel in relation to the coalescer and separator-filter that there is no counterflow of any separated substance in relationship to the flow of the fuel.

A further object of the invention is to combine in one unit a coalescer and a separator-filter and to so place that unit in a housing, with arranging the flow of fuel through the housing in such a manner that the fuel is first caused to pass through the coalescer which will cause the moisture in the fuel to combine into drops, the fuel and drops of moisture then flowing in the same direction to the separator-filter where the drops are separated from the fuel and the other contaminants in the fuel are filtered therefrom, whereby the dry and clean fuel then passes from the housing to the point of use.

The above and other objects and features of this invention will be apparent from the description set forth in the following specification when taken in connection with the accompanying drawing which forms a part of the specification and wherein.

Figures 1, 2, 3:
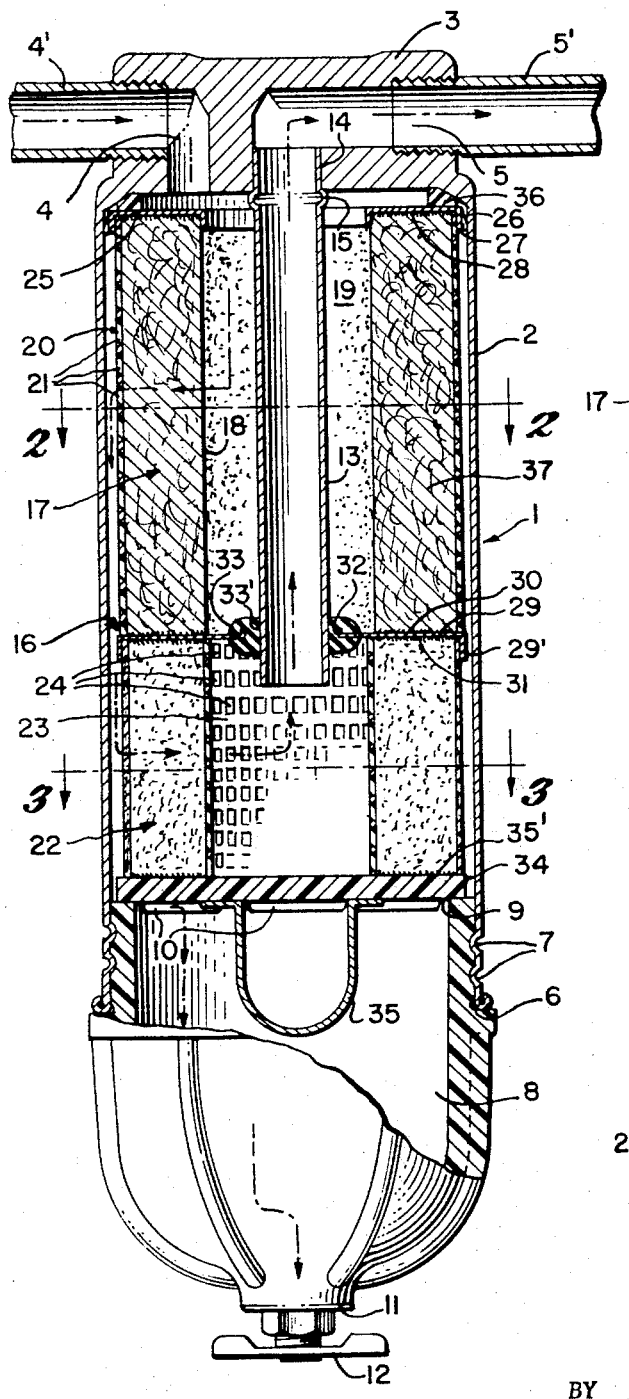
FIG. 1 is a partial vertical section of the housing with the coalescer and separator-filter therein.
FIG. 2 is a cross-section of the coalescer taken on line 2—2 of FIG. 1.
FIG. 3 is a cross-section of the separator-filter taken on line 3—3 of FIG. 1.

A fuel-water separator and filter comprises a housing generally designated 1 having an outer casing 2 provided at one end with a header 3. The header 3 has an inlet 4 and an outlet 5. Tubes 4' and 5' are connected respectively to the inlet and outlet ports 4 and 5 in any well known manner. The opposite end of the outer casing from the header end is open as at 6 and is provided with threads 7. A sediment bowl 8 is threadingly engaged with the threads 7 and closes the open end 6 of the casing 2. The upper edge 9 of the sediment bowl is provided with a series of openings 10 around the periphery thereof the purpose of which will be explained later. The opposite end of the sediment bowl is provided with a drain opening 11 which is closed by a valve 12 and which may be opened for the purpose of draining the sediment and water contained in the bowl from the housing. An outlet tube 13 extends downwardly from the header 3 and is spaced inwardly from the outer casing 2 and is concentric therewith. An opening 14 is provided in the header 3 which leads to the outlet 5 and such opening receives one end of the outlet tube 13. A shoulder 15 on the outlet tube near one end thereof engages the header 3 to prevent the outlet tube from being forced into the header to such an extent that it would cut off flow. The outlet tube may be press-fitted into the header 3 so that it becomes a part thereof.

A combined coalescer and separator-filter generally designated at 16 is mounted within the housing. The coalescer 17 is composed of any hydrophilic material such as fiber glass and is molded into a ring shape. The coalescer 17 is provided with a central inner wall 18 surrounding the outlet tube 13 and is concentric therewith and spaced therefrom. The space between the inner wall 18 and the outlet tube 13 provides a flow space 19. An outer cover or wrapper 20 having perforations 21 is placed around the outer periphery of the coalescer element 17.

The separator-filter part of the stucture 22 is composed of treated filter paper having a central inner tube 23 having perforations 24 therein and which is a part of the combined coalescer and separator-filter and is mounted below the coalescer element. The inner or central tube 23 surrounds a portion of the outlet tube 13 and is also spaced therefrom and concentric therewith. The internal diameter of the inner or central tube is substantially the same as the internal diameter of the inner wall 18 of the coalescer 17.

The coalescer 17 is provided at one end with an end cap 25. The end cap 25 has an external flange 26 which surrounds the end of the outer wall of the coalescer and is provided with outstanding lugs 27 which engage the inner wall of the housing or casing and serve to center the combined coalescer and separator-filter within the casing. The end cap 25 is sealed to the one end of the coalescer 17 by means of a cementitious material 28.

Mounted between the coalescer and the separator-filter and dividing the same is a divider end cap 29 having an external flange 29' which engages the outer peaks of the pleats of the separator-filter at one end thereof. The upper surface of the divider end cap 29 is fastened to the other end of the coalescer 17 by means of a cementitious material 30. The other side of the divider cap 29 is cemented to the ends of the pleated paper filter element 22 by means of a cement 31.

The divider end cap 29 has a central opening 32 therein. Mounted within the opening 32 and carried by the divider cap 29 is a seal 33 of flexible materal. The seal 33 has a central opening 33' into which is inserted the outlet tube 13. The outlet tube is engaged in the opening 33' by a tight engagement and the seal together with the divider cap 29 divides the flow space 19 from the center or inner tube 23 of the separator-filter which is in the outflow path.

Mounted on the other end of the combined element and spaced from the divider end cap 29 a distance equal to the longitudinal extent of the pleated paper separator-filter is an end plate 34. The end plate 34 may be made of a plastic material or metal and is sealed to the end of the pleats by means of a cement 35'. Attached to the other side of the end plate 34 is a handle or tab 35 which may be made integral with the plate 34 or affixed thereto in any well known manner. The handle or tab 35 is used to pull the combined coalescer and separator-filter from the housing 2 when the same has become dirty or so contaminated that its useful life has become extinguished. The other side of the end plate 34 which also carries the handle or tab 35 rests upon the upper edge of the sediment bowl 8 thus leaving the openings 10 in the upper edge exposed to such a point that the separated material from the fuel is allowed to flow down into the sediment bowl 8 and be removed therefrom by opening the valve 12.

A seal 36 is provided between the inner part of the header 3 and the end cap 25 to seal off the entrance to the space between the coalescer 17 and the inner wall of the housing 2 so as to prevent flow of the contaminated fuel without having first passed through the coalescer as will be explained later.

The coalescer 17 is shown in cross-section in FIG. 2 and as described previously is of a molded material which is hydrophilic in character and which is composed of fiber glass or the like 37. The coalescer is molded into a ring or doughnut shape and is provided with an outer wrapper or cover 20.

The pleated paper filter element 22 comprising the separator-filter element is composed of paper material 38 which has been treated by impregnating the same with a resin such as phenol to give it wet strength and also coated with a moisture or water-resistant material such as a silicone which will prevent the water or moisture contained in the fuel from passing through the separator-filter so that a substantially completely dry and clean fuel will emerge from the clean side of the filter and pass through the outlet in the header 3.

The fuel passing through the combined coalescer and separator-filter will flow through the inlet and through the combined elements in the manner shown in the flowlines of the arrows in FIG. 1 and out through the outlet after having substantially all of its moisture and dirt or other contaminants removed therefrom.

The dirty and moisture-laden fuel will enter the header 3 through the inlet 4 and will flow into the flow space 19 in the central portion of the coalescer. From here, it will pass from the inside towards the outside of the coalescer element which will cause the moisture in the fuel to coalesce and form into droplets. The coalescer will also filter some of the contaminants from the fuel. The fuel and the droplets of water will then flow through the space between the inner wall of the housing 2 and the outer wall of the coalescer 17 downwardly and to the pleated paper separator-filter element. Because of the treatment given the separator-filter element, that is, having a coating of moisture or water-resistant material thereon, the coating will separate the droplets of water from the fuel as it passes from the outside in through the perforated center tube 23 to the outlet tube 13. The droplets of water will then flow downwardly on the outside of the pleated paper filter element around the circumference of the end plate 34 through the openings 10 and into the sediment bowl 18. This flow of the droplets of moisture or water may also wash some of the contaminants filtered by the filter from the fuel from the surface of the pleated paper element and also into the sediment bowl. The sediment bowl 18 may be periodically cleaned and drained of the collected water and dirt by opening the valve 12. By having the coalescer 17 and the filter-separator element 22 connected together in the manner shown and in the flow path of the fuel as shown and described, the fuel and the coalesced drops of water or moisture will be flowing in the same direction rather than as heretofore wherein the positions of the coalescer and paper filter elements have been interchanged and the flow is in such a way that the separated droplets of water from the fuel after passing through the separator-filter must flow in a countercurrent direction to the flow of the fuel through the combined element. Such a flow has been very disadvantageous in that if a large amount of moisture is in the fuel, some of that moisture will be carried through the housing to the point of usage to the detriment of the engine or other element which is using the fuel and also the amount of fuel passing through the combined element may be curtailed so that the desired speed of the device using the fuel may not be obtained.

Applicant after studying the prior art devices and noting their deficiencies devised the present structure which serves the purpose for which it was intended in an efficient manner.

While the outlet tube 13 has in FIG. 1 been shown as a part of the header 3 and rigidly connected thereto, it is understood that the same might be made a part of the divider cap 29 and a seal element placed around the openings 14 in the header 3 with the outlet tube 13 being forced through the seal so as to divide the inlet from the outlet in the header 3 and cause the flow of the fuel in the manner depicted.

I claim:

1. A fuel-water separator and filter comprising a housing, an inlet and outlet in one end of the housing and having a flow path therebetween, a unitary combined coalescer and separator-filter in the housing, the coalescer being directly in the inlet side of the flow path, the separator-filter being in the flow path between the coalescer and the outlet, the coalescer and separator-filter being a unitary structure in alignment with each other, and when in position the coalescer being above the separator-filter, an outlet tube in the housing with one end positioned in the outlet, a divider plate between the coalescer and the separator-filter and common to both, the divider having an opening therein, a sealing means within the opening, the sealing means engaging the outlet tube, the other end of the outlet tube extending into the separator-filter to a point closely adjacent the divider, the divider plate, the sealing means and the outlet tube separating the inlet side of the flow path from the outlet side thereof, the coalescer collecting the moisture contained in the fuel and causing the moisture to form into drops, the drops and the fuel then flowing in the flow path in the same direction to the separator-filter where the drops are separated from the fuel, and other contaminants are filtered from the fuel, the filtered and dewatered fuel then passing upwardly through the outlet tube to the housing outlet and the separated water flowing downwardly and a sediment means on the other end of the housing for collecting the moisture and contaminants.

2. A fuel-water separator and filter as set forth in claim 1 wherein the coalescer is a molded ring of fiber glass.

3. A fuel-water separator and filter as set forth in claim 2 wherein the separator and filter is composed of a pleated paper having a coating of a moisture repelling substance thereon.

4. A fuel-water separator and filter as set forth in claim 3 wherein an end cap is adhered to the end of the coalescer adjacent the inlet to the housing, a support plate is adhered to the end of the separator and filter adjacent the sediment means, and the divider plate is adhered to the adjacent ends of the coalescer and separator and filter, thus making a removable unitary structure.

5. A fuel-water separator an filter as set forth in claim 4 wherein the unitary structure is spaced inwardly from the inner wall of the housing to provide the flow path therearound, and the unitary structure has an internal diameter substantially constant throughout.

6. A fuel-water separator and filter comprising a housing, a header closing one end of the housing, an inlet and outlet in the header, a flow path between the inlet and outlet, a unitary combined coalescer and separator-filter in the housing, the coalescer and the seperator-filter being a unitary structure and in alignment with each other, with the coalescer being above the separator-filter when in position, the coalescer being directly in the inlet side of the flow path, the separator-filter being in the flow path between the coalescer and the outlet, the coalescer being a molded ring of fiber glass, the separator-filter being a pleated paper ring having a coating of a moisture repelling substance thereon, an outlet tube fixed in the outlet of the header and extending into the center of the housing a distance greater than the extent of the coalescer, an end cap on one end of the coalescer adjacent the header, the end cap having an extending flange surrounding that end of the coalescer, the end cap being secured to that end of the coalescer, the flange having means thereon engaging the inner wall of the housing to center that end in the housing and spacing the unitary structure from the inner wall of the housing, the end cap having a sealing means on the other face thereof engaging the header, the housing having an open end, fastening means on the open end, a supporting plate on the separator-filter adjacent the open end of the housing, the supporting plate being adhered to the ends of the pleats of the separator-filter, a divider plate between the coalescer and the separator-filter and being adhered to the adjacent ends of each, the divider plate having a center opening therein, a sealing ring in the opening, the outlet tube being concentric with the coalescer and within the ring, the sealing ring engaging the outlet tube, the outlet tube having an open end, the open end extending into the interior of the separator-filter and concentric therewith, the divider plate, the sealing ring and the outlet tube separating the inlet side of the flow path from the outlet side thereof, a sediment bowl on the open end of the housing and fastened thereto by the fastening means, the sediment bowl having an upper edge, the upper edge having openings therein, the supporting plate engaging the upper edge of the sediment bowl and leaving the openings free to allow flow into the sediment bowl, the sediment bowl having a closed bottom and drain valve means in the closed bottom, the moisture and contaminated fuel entering the housing through the inlet will flow to the center of the coalescer and outwardly through the same whereupon the coalescer will absorb the moisture and form the same into drops, the fuel and drops of moisture will then flow in the same direction around the space between the inner wall of the housing and the unitary structure and thence through the separator-filter where the drops of moisture will be separated from the fuel and the contaminants will be filtered from the fuel, the substantially dry and clean fuel will then flow into the center of the separator-filter and upwardly through the outlet tube and through the outlet in the header, the drops of moisture and some of the contaminants flowing from the separator-filter through the openings in the upper edge of the sediment bowl into the sediment bowl where they will be collected and periodically drained therefrom through the drain valve.

References Cited

UNITED STATES PATENTS

| 3,144,407 | 8/1964 | Olmes | 210—335 X |
| 3,297,160 | 1/1967 | Humbert | 210—307 X |
| 3,312,351 | 4/1967 | Kasten | 210—307 |

FOREIGN PATENTS 752,029    7/1956    Great Britain.

REUBEN FRIEDMAN, Primary Examiner

FRANK A. SPEAR, JR., Assistant Examiner

U.S. Cl. X.R.

210—313, 316, 336